Sept. 4, 1951  R. E. STUTZKE  2,566,779
ADJUSTABLE LIMIT CONTROL FOR TRACTOR LIFT SHAFTS
Filed Nov. 29, 1946  3 Sheets-Sheet 2

Inventor:
*Robert E. Stutzke*
per
Attorney

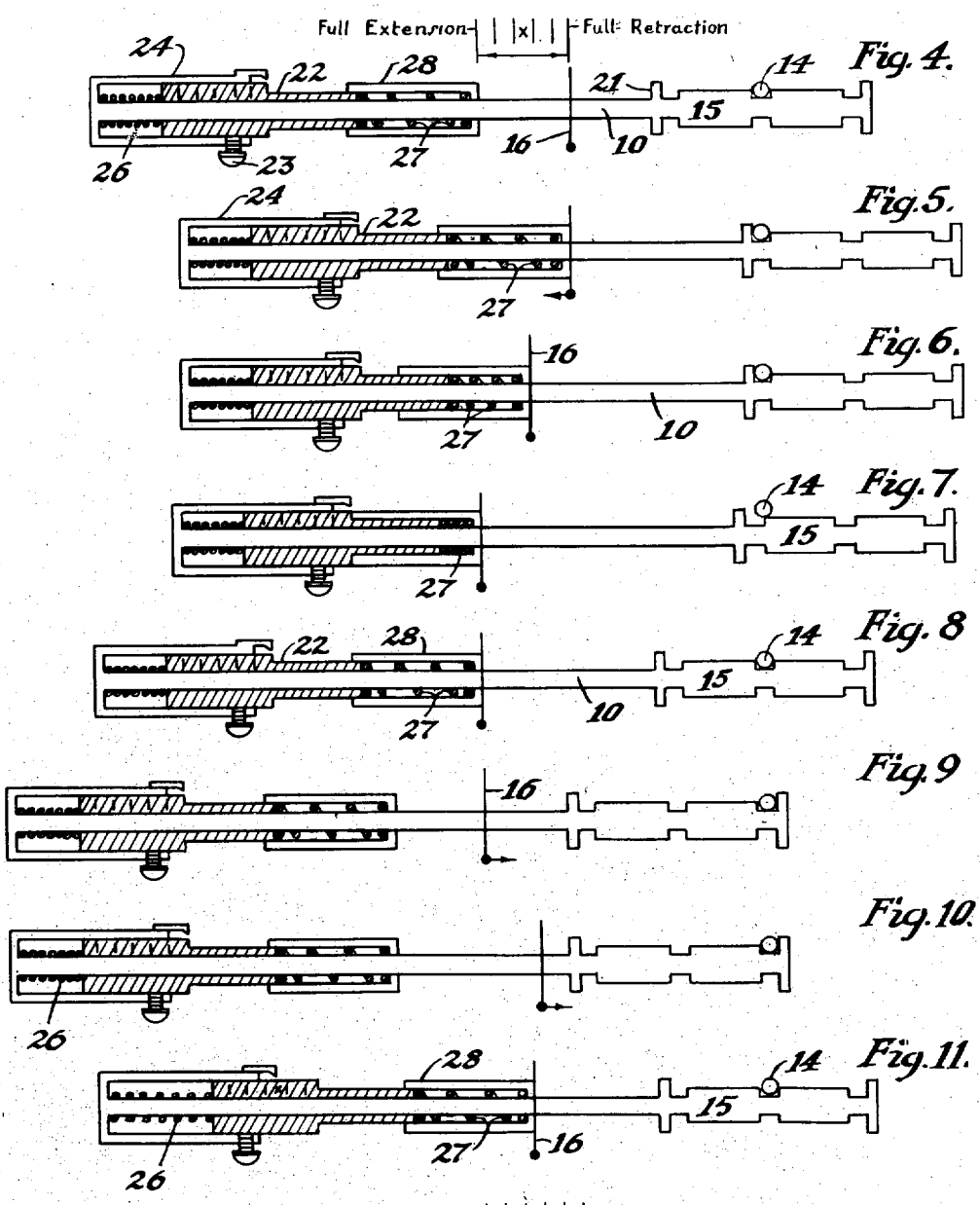

Patented Sept. 4, 1951

2,566,779

UNITED STATES PATENT OFFICE 2,566,779

ADJUSTABLE LIMIT CONTROL FOR TRACTOR LIFT SHAFTS

Robert E. Stutzke, Louisville, Ky., assignor to B. F. Avery & Sons Company, Louisville, Ky., a corporation of Delaware Application November 29, 1946, Serial No. 713,052

19 Claims. (Cl. 121—38)

Farm tractors are commonly provided with power operated "lift" shafts which may be angularly extended and retracted over a predetermined working angle to lower and raise the ground working tools of certain tractor drawn implements such as rakes, mowers, plows and the like or to "angle" and straighten the ground working tools of other tractor drawn implements such as disc harrows. To effect a power operation of the "lift" shaft, tractors are conventionally equipped with a double acting hydraulic power unit for extending and retracting the shaft; a continuously operating engine-driven pump for energizing the power unit; a normally closed reversible valve controlling the pump connection to the power unit; a manually operable valve rod for operating the valve in one direction from off to on to extend the shaft and in the opposite direction from off to on to retract the shaft; and spring means yieldably urging the valve rod toward and normally holding it in the valve closed position.

It is desirable to provide a control mechanism for latching the valve rod in each of its on positions and for automatically unlatching it to stop the "lift" shaft in its fully retracted position and in any of a number of predetermined extended positions ranging from a desired minimum degree of partial extension to full extension. Such forms the principal object of the present invention.

Another object of the invention is to provide a control mechanism which operates to stop the shaft in its fully retracted position and which may be easily and quickly adjusted to stop the shaft in any predetermined extended positions ranging from partial to full extension.

A further object of the invention is to provide a control mechanism which is inexpensive to construct, simple to operate and reliable in operation.

An embodiment of the invention is illustrated in the accompanying drawing wherein:

Figs. 4–11 are schematic views of the control mechanism at various stages of its operation.

Figure 1:
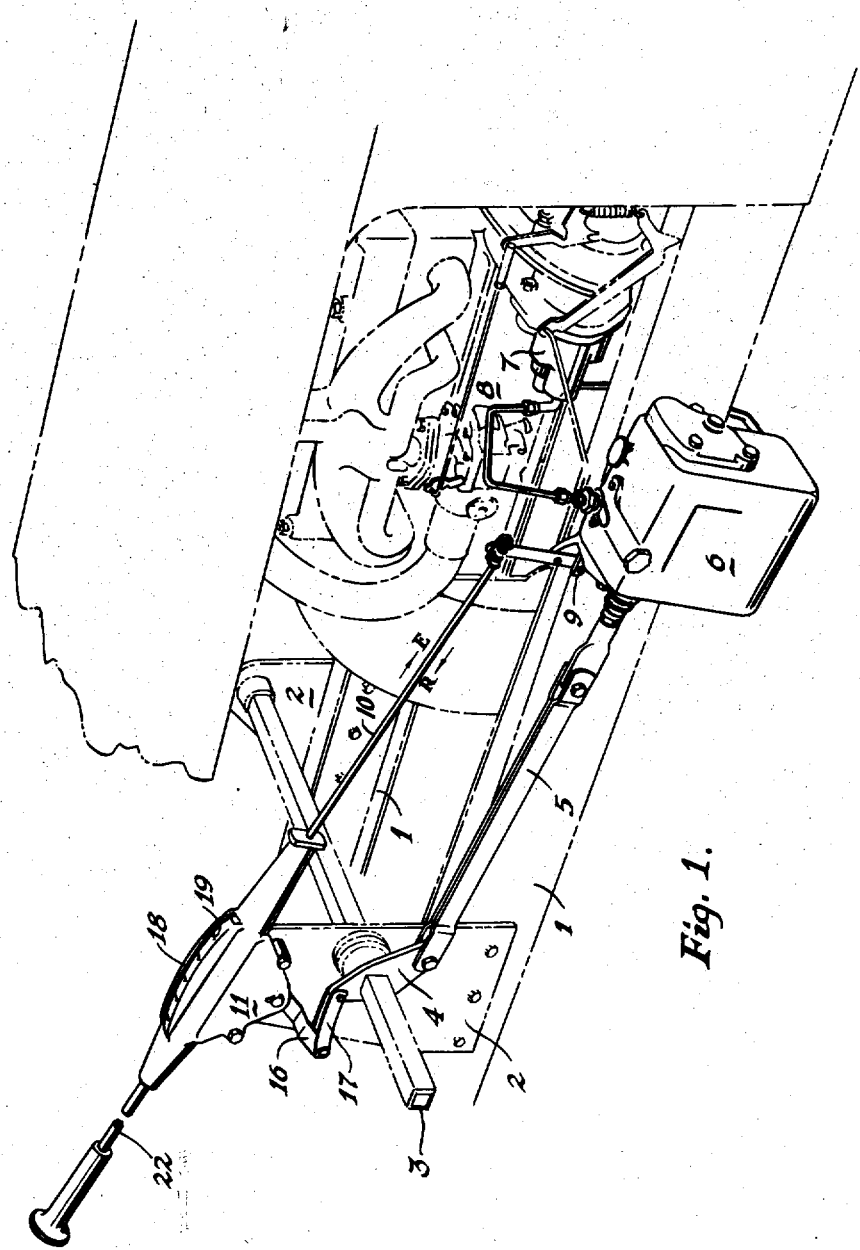
Fig. 1 is a perspective view of an embodiment of my invention applied to a tractor, this view showing the relation of the control mechanism to the control mechanism to the other parts involved in its operation.

Conventional structure of Fig. 1

As indicated above, Fig. 1 shows the control mechanism mounted on a tractor and operatively connected to the various other parts involved in its operation. The arrangement shown in Fig. 1 conventionally includes: a tractor frame 1; a pair of upright brackets 2 mounted on opposite sides of the frame 1 in opposed relationship; a "lift" shaft 3 rotatably mounted on the brackets 2 for angular extension and retraction over a predetermined working angle between fully extended and fully retracted positions; a crank arm 4 rigidly mounted on the shaft 3 and connected by a link 5 to a double acting hydraulic power unit 6, which is energized by a pump 7; a tractor engine 8 operatively connected to drive the pump continuously so long as the engine is running; a normally closed reversible valve 9 controlling the pump connection to the power unit; and a manually operable valve rod 10 for operating the normally closed valve from "off" to "on" in one direction (see arrow E) to a shaft extending position and from "off" to "on" in the opposite or reverse direction (see arrow R) to a shaft retracting position. The power unit illustrated is of a conventional type which not only encloses the body of the the valve 9 but also conceals the spring means which yieldably urges the valve rod toward, and normally holds it in, the valve closed or off position.

Figure 2:
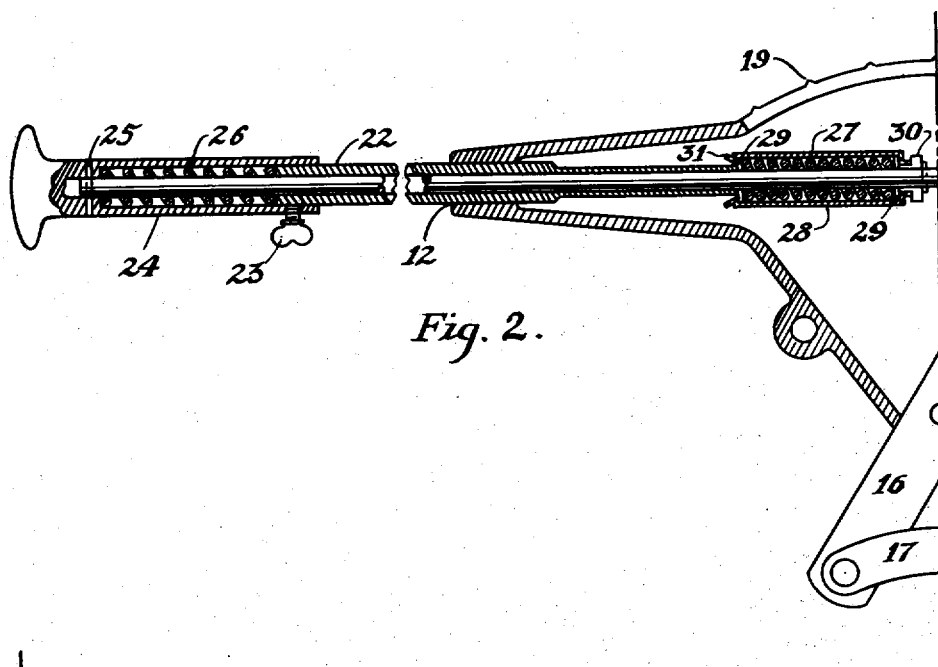
Fig. 2 is a longitudinal vertical section through one-half of the control mechanism.
Figure 3:
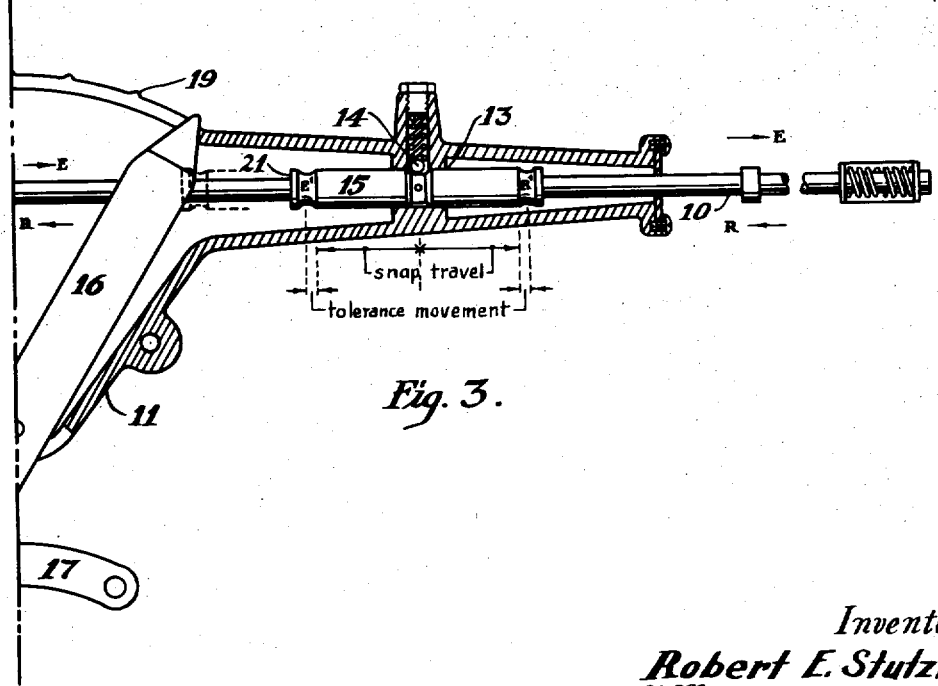
Fig. 3 is a similar section through the other half thereof.

Control mechanism of Figs. 2 and 3

Speaking generally a control mechanism constructed in accordance with my invention includes: (a) means for movably supporting the valve rod 10 on the tractor; (b) a latch mechanism for releasably holding the valve rod in either of its operating positions; (c) a limit arm connected to the "lift" shaft for angular extension and retraction movement in the path extending along the valve rod 10; (d) a retraction stop fixedly mounted on the valve rod in a position such that, when the rod is retracted to and latched in its retracted position, the stop will be correspondingly retracted to a setting in the retraction path of the limit arm where it will ultimately be engaged by the retracting limit arm and moved sufficiently to unlatch the valve rod in time to stop the shaft in its fully retracted position; and (e) an extension stop adjustably mounted on the valve rod 10 in a position such that, when the rod is extended to and latched in its extended position, the extension stop will be correspondingly extended to a setting in the extension path of the limit arm where it will ultimately be engaged by the extending limit arm and moved sufficiently to unlatch the valve rod 10 in time to stop the shaft in an extended position corresponding to the setting of the extension stop.

The means for movably supporting the valve rod 10 on the tractor includes a casing 11 in which the valve rod is slidably mounted intermediate its ends, the casing 11 being fixedly mounted on one of the brackets 2. The casing has bearing seats 12 and 13, at or adjacent its opposite ends, on which the valve rod is slidably supported.

The latch mechanism for the valve rod is located at the bearing seat 13 of casing 11. It includes: a spring pressed ball 14 mounted in the bearing seat; and an elongate collar 15 fixedly mounted on the rod for movement therewith axially along the bearing seat. The collar has a centrally disposed recess for receiving the ball 14 to latch the rod in the valve closed position and recesses E' and R', which are disposed equidistantly from opposite sides of the central recesses, for receiving the ball to latch the rod in the shaft extending and retracting positions respectively. Only a small horizontal movement of the valve rod is necessary to raise the ball vertically out of either recess E' or R' and thus unlatch the rod. At the end of this small "unlatching movement," the valve spring moves the valve rod to the off position with a snap action. This latter movement is herein designated as the "snap travel" of the rod.

The limit arm, which is connected to the lift shaft for angular extension and retraction in a path extending along the valve rod 10, comprises an arm 16 pivotally mounted adjacent the bottom of the casing 11 to project from the pivot both downwardly out of the casing and upwardly through the casing. The downwardly projecting end of the limit arm 16 is connected through a link 17 to an extension of the crank arm 4 on the "lift" shaft. When the "lift" shaft is angularly extended or retracted, the upper portion of the limit arm, which is forked to extend on both sides of the valve rod, will be correspondingly extended and retracted over a predetermined path extending along the valuve rod 10. One prong of the upper end of the limit arm 16 projects through a slot 18 in the top of the casing 11. The casing is provided with graduations 19 spaced along this slot and providing, for the operator of the tractor, a readily visible indication of the lift shaft position.

The retraction stop may be any suitable member fixedly mounted on the valve rod 10. In the present case, the left end 21 of the latching collar 15 functions as a retraction stop. When the valve rod is retracted to and latched in its retracted position, the retraction stop 21 will be simultaneously and correspondingly retracted to and held in a retracted position in the retraction path of the limit arm 16, this position being indicated in dotted lines in Fig. 3. In this position, it will be engaged by the retracting limit arm 16 when the retracting lift shaft 3 and the limit arm 16 each reach a position slightly in advance of its fully retracted position. As the lift shaft, and limit arm continue on to their respective fully retracted positions, the limit arm will move the rod from its retracted position, over the small distance required to unlatch it, and the valve will then snap the rod to its off position, both of these operations occuring in time to stop the lift shaft in its fully retracted position.

An extension stop may be provided by any suitable member mounted on the valve rod 10 for adjustment along and securement to the rod in any setting within the extension range required for stopping the lift shaft at desired degrees of extension ranging from partial to full. For all practical purposes, the adjustment of the extension stop can be made only when the valve rod is in the off position; hence only when the extension stop is in its off position for a given extension setting. In such off position, the extension stop is properly spaced from its extended position, for the given extension setting, by a distance equal to the full extension travel of the rod i. e. the travel it undergoes during its unlatching movement and its snap travel. In such off position also, it is always spaced from the extended position, at which the limit arm will finally come to rest for that particular extension setting of the stop, by a distance equal to the snap travel of the rod.

Accordingly, the extension stop must be set by guess unless graduations are provided for visually indicating the appropriate adjustment required for desired degrees of extension. But even with graduations, the manual adjustment still requires bothersome visual observance and adjustment time. It is desirable, therefore, to provide a simple arrangement which, with little or no attention, can be easily and quickly operated to set or reset the extension stop more or less automatically at any desired point within the necessary range.

The present invention utilizes an extension stop mounted on the valve rod 10 for adjustment along and securement to the rod within that range of positions which is required to stop the lift shaft within its desired range of partial to full extension and permits automatic resetting of the extension stop when the rod is in its off position with the lift shaft and limit arm in the position of newly desired extension. Automatic reset is accomplished, in accordance with the present invention, by the provision of resilient means which, when the stop is released from the rod, operate automatically to move the extension stop along the rod to a position wherein it is spaced, from the newly extended position of the limit arm, by a distance equal to the snap travel of the rod. The resilient reset means utilizes one spring for urging the extension stop along the rod toward the newly extended limit arm and another spring for spacing the spring urged stop from the limit arm by a distance equal to the snap travel of the rod. With this arrangement, it is only necessary to release the stop momentarily because the two springs operate both instantly and automatically to reset the stop upon its release.

Stated somewhat more specifically, the extension stop mechanism of this invention comprises: an extension stop of the character stated; securing means for releasably securing it fixedly to the rod in any of its operative settings; yieldable means urging the stop toward the limit arm; and normally elongate compressible means arranged between the stop and limit arm for lineal movement with the released stop and for compressing movement relatively toward the secured stop, said elongate means being compressible over a distance equal to the snap travel of the rod from its normally elongate position to a compressed position in which it positively engages the stop; said yieldable and compressible means being cooperatively operable, when the limit arm is in a position of newly desired extension and the rod is in its off position, to move the stop and elongate means along the rod, automatically upon the release of the stop from the rod, to an adjusted position in which the elongate member spaces the stop from the extended limit arm by a distance equal to the snap travel of the rod.

The extension stop comprises a sleeve 22 slidably mounted on the rod between the limit arm and the free end thereof. The securing means comprises a screw 23 for releasably securing the extension stop 22 to the valve rod 10. In the embodiment shown the screw 23 releasably secures the stop 22 to an end sleeve 24 into which the stop projects. The end sleeve 24 encloses the free end of the rod and is rigidly secured thereto by a pin 25.

The yieldable means comprises an urging spring 26 positioned within the end sleeve 24 to encircle the rod between the adjacent end of the stop 22 and an opposed wall of the end sleeve 24. In Fig. 2 the urging spring 26 is shown in its fully expanded condition which corresponds to the least extension of the lift shaft and the limit arm.

The elongate compressible means comprises a spring 27 encircling the valve rod 10 between the stop 22 and the limit arm, shown in its fully expanded position in Figure 2. The compressible spring 27 is enclosed within a cylinder 28 between washers 29 at opposite ends of the cylinder, and the limit arm end of the cylinder has a collar 30 serving as an abutment for engagement by the limit arm. When collar 30 is engaged by the limit arm in moving toward the left the spring 27 provides a yielding lost motion and is compressed between one washer 29 engaging sleeve 22 and the other washer 29 at the limit arm end of the cylinder. However, a pair of lips 31 prevent the spring 27 forcing the adjacent washer 29 out of the cylinder.

*Operation see Figs. 4–11*

The operation of the extension stop mechanism may be readily explained by reference to the schematic views shown in Figs. 4–11, wherein the full extension travel of arm 16 is assumed to be substantially equal to the snap travel of the valve rod although ordinarily it will be much greater.

Fig. 4 shows the valve rod 10 in its off position, the limit arm 16 in its fully retracted position and the extension stop 22 in the position on valve rod 10 when it is set to stop the lift shaft at its fully extended position.

Fig. 5 shows the parts as they appear when the valve rod and extension stop have been moved to the shaft extending position but before movement of the limit arm in the direction indicated by the arrow has begun. In this position, it will be noted that the abutment 30 has been moved with the valve rod and engages the limit arm, and the spring 27 is substantially non-compressed.

Fig. 6 simply shows the parts as they appear during the ensuing extension movement when the limit arm has reached the midway point of its extension travel. It will be noted now that the spring 27 is partly compressed.

Fig. 7 shows the position of the parts after the elongate member has been fully compresed and then moved together with the stop 22 and the valve rod 10 over the small distance required to unlatch the rod from the ball 14.

Fig. 8 shows the parts as they appear when the rod returns to its off position. Here again it will be noted that the elongate compressible means has returned to its fully expanded position in which it engages the fully extended limit arm.

Fig. 9 shows the parts as they appear when the rod 10 is moved from the off position to its shaft retracting position but before the retracting movement of the limit are in the direction shown has begun.

Fig. 10 shows the parts as they appear when the limit arm has reached a position of partial retraction in its movement toward the retraction stop. It will be understood that the limit arm will continue to retract until it strikes the stop 21 and unlatches the rod 10.

Fig. 11 illustrates the mechanism after it has been reset to stop the lift shaft automatically at a point of midway extension. To effect the necessary change in the setting of the stop 22 from the full extension setting shown in Figs. 4–10, the valve rod is manually retracted from its off position in Fig. 8 to its retracted position in Fig. 9 to initiate the retraction of the lift shaft. When the lift shaft reaches a position of half way extension, the valve rod is manually pushed out of its retracted position and returned to the off position. The extension arm 16 and control rod 10 now will be in the position shown in Figure 11, but extension stop 22 will be in the relative position shown in Figure 4, and the limit arm will be spaced from the elongate compressible means 28 a distance equal to the distance between the fully extended and half way extended positions of the limit arm. Automatic reset is now accomplished simply by releasing the screw 23 momentarily. During momentary release, the urging spring expands from its relatively compressed position shown in Fig. 4 to the less compressed position shown in Fig. 11 and, in expanding, it moves the extension stop 22 and the elongate compressible means toward and into engagement with the limilt arm as shown in Fig. 11 whereupon it is only necessary to retighten the screw 23 to hold the extension stop in its new setting. The urging spring 26 does not compress the spring 27; hence in the new setting, when the control rod 10 is moved to the position shown in Figure 5 to initiate extension of the shaft, the compressible means in the extension stop is compressed so that only a slight movement of arm 16, is sufficient to move the ball 14 out of the detent to allow the valve rod to snap to off position. When thus adjusted, the operator need only move the rod from its off position to its retracted position to retract the limit arm and stop it automatically in its fully retracted position. Now, when the operator moves the control rod from its off position to its extended position, the limit arm moves to the left and by the time it reaches the halfway position spring 27 has been fully compressed so that only a slight further movement is required to raise the ball 14 out of its groove to permit the control rod to close the valve and thus automatically stop the shaft in a position of half way extension.

Having described my invention, I claim:

1. In a control mechanism for a tractor lift motor reversing valve having an intermediate off position: a limit arm adapted to be moved by a rotatable shaft between two extreme positions; a valve control rod having an abutment thereon adapted to be engaged by said limit arm adjacent one extreme position; a second abutment movable along said rod; a positioning member movable on said rod; means for locking said positioning member in adjusted position; resilient means between said second abutment and positioning member providing a lost motion connection; and resilient means biasing said positioning member toward said limit arm.

2. A control mechanism as specified in claim 1 having detent means yieldably holding said control rod in intermediate and extreme positions.

3. In a control mechanism for a tractor lift motor reversing valve having an intermediate off position: a limit arm adapted to be moved by a rotatable shaft between two extreme positions; a valve control rod having an abutment thereon adapted to be engaged by said limit arm adjacent one extreme position; a second abutment on said rod adapted to be engaged by said limit arm adjacent the other extreme position thereof; means for locking said second abutment on said rod at an adjusted position to vary the engaging position of said limit arm and latter abutment, and means biasing said second abutment toward said arm.

4. In a control mechanism for a tractor lift motor reversing valve having an intermediate off position: a limit arm adapted to be moved by a rotatable shaft between two extreme positions; a valve control rod having an abutment thereon adapted to be engaged by said limit arm adjacent one extreme position; a spring abutment on said rod; a spring engaging said abutment; a sleeve slidable on said shaft engaging said spring at one end and providing an abutment at the other end adapted to be engaged by said limit arm adjacent the other extreme position thereof; and means for locking said sleeve on said rod at an adjusted position to vary the engaging position of said limit arm and latter abutment.

5. A control mechanism as specified in claim 4 having means biasing said second abutment toward said limit arm.

6. A control mechanism as specified in claim 5 having indexing means to indicate the position of said limit arm.

7. In a control mechanism for a tractor lift motor reversing valve: a limit arm adapted to be moved by a rotatable shaft between two extreme postions; a valve control rod having an abutment thereon adapted to be engaged by said limit arm adjacent one extreme position; detent means for yieldingly holding said control rod in intermediate and extreme positions; a sleeve slidable on said rod; a second abutment movable with said sleeve and adapted to be engaged by said limit arm in movement toward the other extreme position; a second sleeve on said rod having a telescoping engagement with the first sleeve; a spring in said second sleeve engaging the first sleeve; and means for locking said sleeves together.

8. In a control mechanism for a tractor lift motor reversing valve having extension and retraction positions, and an intermediate stop position; a valve control rod adapted to be connected to said valve; means yieldingly retaining said rod in intermediate or in end positions; a limit arm adapted to be operated by a rotatable shaft between extended and retracted positions; a stop on one side of said limit arm adapted to be engaged by said limit arm, and a second stop adjustably carried on said rod and adapted to be engaged by said limit arm; and means for adjusting the position of said second stop.

9. In a control mechanism for a tractor lift motor reversing valve having extension and retraction positions, and an intermediate stop position: a valve control rod adapted to be connected to said valve; detent means selectively yieldingly retaining said rod in intermediate extension or retraction positions; a limit arm adapted to be operated by a rotatable shaft between extended and retracted positions; an abutment on said rod on one side of said limit arm and adapted to be engaged by said arm to move said rod out of retraction position; means on the opposite side of said limit arm having an abutment resiliently carried thereby and adapted to be engaged by said limit arm to move said rod out of extension position; and adjustable means resiliently positioning said latter means on said rod.

10. In a control mechanism for a tractor lift motor reversing valve biased to an intermediate off position: a valve rod actuator movable between two extreme positions; a valve control rod having an abutment thereon adapted to be engaged by said actuator adjacent one extreme position; a second abutment movable along said rod; a positioning member movable on said rod; resilient means providing a lost motion between said abutment and positioning means; means locking said positioning means in adjusted position on said rod; and means releasably latching said rod in extreme positions against the bias of said valve.

11. In combination with a servo-motor controlled by a reversing valve having an intermediate off position and motor retraction and extension positions; of a tool raising and lowering shaft connected to be oscillated thereby; a limit arm connected to be moved by said shaft; a valve operating rod; an abutment on said rod positioned to be engaged by said limit arm adjacent one extreme of its movement; a second abutment adjustably mounted on said rod in position to be engaged by said limit arm upon movement in the opposite direction; means for locking said second abutment in adjusted position; resilient means biasing said second abutment toward said limit arm; indexing means to show the position of said shafts; and detent means yieldably locking said valve in retraction and extension positions.

12. In a control mechanism for a tractor lift motor reversing valve having an intermediate off position; a limit member adapted to be moved between two extreme positions; a valve control member having an abutment thereon positioned to be engaged by said limit member upon movement in one direction; a second abutment adjustably carried by said valve control member to be engaged by said limit member upon movement in the opposite direction; releasable means for retaining said second abutment in set position on said control member; and spring means operable upon release of said releasable means for biasing said second abutment toward the limit member.

13. In a control mechanism for a tractor lift motor reversing valve having an intermediate off position: a limit member adapted to be moved between two extreme positions; a valve control member having an abutment thereon positioned to be engaged by said limit member upon movement in one direction; a second abutment adjustably carried by said valve control member to be engaged by said limit member upon movement in the opposite direction; releasable means for retaining said second abutment in set position on said control member; limit means on said control member operable upon release of said stop means to limit movement of the second abutment in a direction away from the limit member; and spring means operable upon release of said releasable means for biasing said second abutment toward the limit member.

14. In a control mechanism for a tractor lift motor reversing valve having an intermediate off position: a limit arm adapted to be moved by a rotatable shaft between two extreme positions; a valve control rod biased to off position and having an abutment positioned thereon in position to be engaged by said limit arm adjacent one extreme position; a second abutment movable on said rod in position to be engaged by said limit arm adjacent the other extreme position thereof; a positioning member engaging said second abutment and movable along said rod to vary the engaging position of said limit arm and second abutment; resilient means between said rod and positioning member; and means for locking said positioning member on said rod.

15. In a control mechanism for a tractor lift motor reversing valve having an intermediate off position: a limit arm adapted to be moved by a rotatable shaft between two extreme positions; a movable valve control rod biased to off position and having an abutment thereon located to be engaged by said limit arm adjacent one extreme position; a second abutment on said rod located to be engaged by said limit arm adjacent the other extreme position thereof; detent means yieldably retaining said rod in off position; and means for locking said second abutment on said rod at an adjusted position to vary the engaging position of said limit arm and second abutment.

16. In a control mechanism for a tractor lift motor reversing valve: a limit arm adapted to be moved between two extreme positions; a movable control rod adapted to be connected to the reversing valve for cooperation with said limit arm and having an abutment thereon located to be engaged by said limit arm adjacent one extreme position; a second abutment movable along said control rod and located to be engaged by said limit arm upon movement thereof toward the other extreme position; resilient means urging said second abutment toward said limit arm; an adjustment member for said resilient means; a second resilient means oppositely biasing said rod and adjustment member; and means releasably locking said rod and adjustment member against relative movement.

17. In a control mechanism for a tractor lift motor: a motor reversing valve member movable from a motor-off position to forward and reverse motor operating positions; a rod connected to said valve member for moving it from its off position to its motor operating positions, said rod having corresponding positions and being manually movable from a valve-off position forwardly to one operating position and backwardly to the reverse operating position; detent means arranged to hold said rod and valve member yieldably in each operating position; a limit arm connected to be moved, by the motor, correspondingly back and forth between two extreme positions; and motor stopping means for each extreme position of the arm, one stopping means being arranged on the forward side of the limit arm in position to be actuated by the arm, as it moves forwardly toward one of its extreme positions and the other stopping means being arranged on the backward side of the limit arm in position to be actuated by the arm, as it moves backwardly toward the other of its extreme positions, each of said stopping means being connected to the valve rod and operable when actuated to release the valve member and rod from the detent, which holds them in an operating position, so as to allow them to return to the off position.

18. The mechanism of claim 17 wherein: said limit arm is arranged for back-and-forth movement along the rod; and said arm and rod are so arranged that, when the rod is moved in one direction to one of its operating positions, the limit arm is then caused to move in the reverse direction; and said motor stopping means are mounted on the rod.

19. The mechanism of claim 18 wherein: one of said motor stop means is normally mounted on the rod at a position corresponding to one extreme position of the limit arm; and the other motor stop means is slidably mounted for movement along the rod to vary the location of the other extreme position of the limit arm; and means are provided for releasably locking the adjustable stop means to the rod at its adjusted position.

ROBERT E. STUTZKE.

REFERENCES CITED

The following references are of record in the file of this patent:

UNITED STATES PATENTS

| Number | Name | Date |
| --- | --- | --- |
| 279,887 | Stitzel | June 19, 1883 |
| 1,667,138 | Barks | Apr. 24, 1928 |
| 2,286,256 | Brown | June 16, 1942 |
| 2,311,516 | Brown | Feb. 16, 1943 |

Certificate of Correction

Patent No. 2,566,779 September 4, 1951

ROBERT E. STUTZKE

It is hereby certified that the above numbered patent was erroneously issued to "B. F. Avery & Sons Company, of Louisville, Kentucky, a corporation of Delaware," as assignee, whereas said patent should have been issued to *Minneapolis-Moline Company, a corporation of Minnesota, assignee by mesne assignments*; and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*